Patented June 11, 1929.

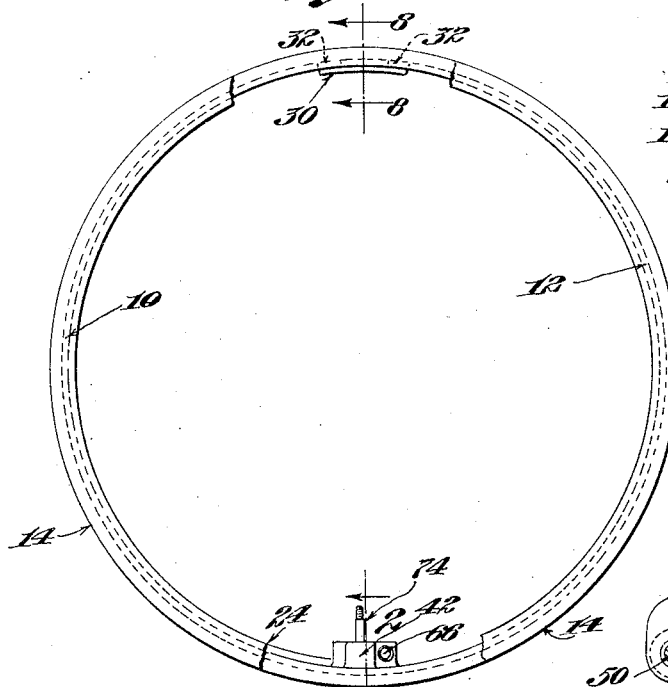

1,716,845

UNITED STATES PATENT OFFICE.

GUSTAF E. ANDERSON, OF BROCKTON, MASSACHUSETTS.

DEMOUNTABLE RIM.

Application filed May 6, 1926. Serial No. 107,139.

This invention relates to demountable rims used in connection with vehicle wheels for carrying cushion or pneumatic tires and more particularly to a rim made in two circumferential sections with means for locking the sections together in assembled relation.

The forms of demountable rims now most generally in use are split transversely to permit the removal of the tire therefrom but in most constructions the bending of one end of the rim inwardly to permit the removal of the tire requires special appliances which are generally of such bulk and size that only garages find it practicable to carry them. Generally the automobile owner is not equipped with such tools and is unable to change a tire on the general types of rims now in use while on the road. In consequence, the carrying of one or two extra rims becomes a necessity.

The main object of my invention is the provision of a demountable rim so constructed that it may be easily dis-assembled or assembled with the use of an ordinary wrench thereby permitting tires to be removed from or mounted on rims at any time or anywhere without requiring the use of special tools or equipment.

A further object of the invention is the provision of a demountable rim which is simple in construction and in operation and of a comparatively low cost of construction.

Another object of the invention is the provision of simple means for locking the two sections together of such form that in the locking operation the two sections are drawn tightly together into abutting relation.

My invention contemplates a demountable rim made in two circumferential sections of similar construction provided with means for locking the two sections together in assembled relation. In the preferred form of the invention the two members are provided at a point opposite to the location of the opening for receiving the valve stem of the inner tube with means adapted to interlock to prevent separation of the sections on that side and at the valve stem point with means for locking the two sections together in assembled relation. The interlocking means are so constructed that the two sections are easily interlocked on the side opposite the location of the valve stem opening when separated at the valve stem opening but are held together rigidly when the two members are closed together at the said opening. The locking means are designed in the locking process to draw the two sections together into abutting relation.

In the accompanying drawings, illustrating the preferred form of my invention, Figure 1 is a side elevation of a rim constructed in accordance with my invention, side portions being broken away to show the means for locking the two circumferential sections together; Fig. 2 is a cross-sectional view on line 2—2 in Fig. 1 on an enlarged scale showing in addition a portion of a pneumatic tire mounted on the rim; Fig. 3 is a circumferential sectional view on line 3—3 in Fig. 2; Fig. 4 is a plan view of the inner face of a transverse section of the rim at and adjacent to the valve stem opening; Fig. 5 is a side elevation of a locking plate, the pivot pin and locking pin being shown in sections; Fig. 6 is a view in perspective of the locking pin; Fig. 7 is a top plan view of the operative end of the locking pin; Fig. 8 is a cross sectional view on line 8—8 in Fig. 1 showing the fixed interlocking means at that side of the rim opposite the valve stem opening; Fig. 9 is a plan view of the same as viewed from a point within the rim.

Referring to the drawings illustrating one form of my invention, there is shown a rim comprising two circular members or circumferential sections 10 and 12 which are substantially the sections which would result from cutting an ordinary solid rim circumferentially in the middle. Each of these sections 10 and 12 is provided at its outer edge with a tire flange 14 of ordinary form adapted to hold one lip or bead 16 of a tire 18 when the sections are assembled, the tire shown being a conventional form of pneumatic tire. The body portions 20 of the sections are straight but the outer corners 22 (Fig. 8) of their engaging inner edges 23 may be bevelled if desired. The inner face of the section 10 may be provided with a projecting circumferential rib 24 adapted for supporting that side of the rim when mounted on the felly 26 of a vehicle wheel.

For locking the two sections of the rim together on that side opposite the valve stem opening, any suitable interlocking means may be provided and one form is shown comprising a plate 30 (Fig. 9) secured to one section for overlapping the inner face of the other section and provided at one edge with laterally turned tongues 32 (Fig. 8) adapted to fit corresponding slots 34 in the body portion 20 of the other section. The plate may be riveted to one of said sections by rivets 36 or it may be fastened thereto in any suitable manner or may be formed integral therewith. Since the interlocking means may be of a large variety of forms, I do not wish to be limited to any specific form thereof.

For locking the two sections or rim members together means are provided, preferably located at or adjacent the valve stem opening, and one form of this means comprises a pair of ears or lugs 40 and 42 mounted one on each of said sections and adapted to be drawn together and locked in engaging position by a bolt or pin 44. Preferably the ear 40 is provided with a semi-circular lateral extension 46 having the valve stem opening 48 therein and the ear 42 is bent midway into semi-circular form longitudinally (Fig. 4) to fit around the extension 46. This construction gives an extended bearing for the valve stem. The inner edges 23 of the two sections 10 and 12 may be formed similarly to the ears 40 and 42 in plan and in such case the member 12 has a semi-circular edge projection which fits into a corresponding recess in the abutting edge of the member 10. As thus formed the section 12 would extend the bearing for the valve stem.

The ears 40 and 42 may be secured to the respective rim sections or may be made integral therewith. Upon the outer face of the ear 40 is pivotally mounted on a pin 50 set in one end of the ear a vertical locking plate 52 (Fig. 5) which at its other end is provided with an opening 54 which is nearly a complete circle with a straight or chord portion 55 at its top as shown in the drawings. The two ears are provided with a transverse bore in which fits the locking bolt 44 and its end is provided with a flat portion 56 (Fig. 6) to permit it to project through the opening 54 in the locking plate. Adjacent one end the locking bolt is provided with a transverse recess 60 extending from the middle of the flattened portion 56 partially around the bolt. The wall 62 of the recess adjacent the end of the bolt is slightly oblique to a plane perpendicular to the longitudinal axis of the bolt so that the nose 64 is wedge-shaped. The head 66 of the bolt is of a shape to receive a wrench and is provided with an enlarged bearing collar 68 for engaging the outer surface of the ear 42. The end of the bolt projects through the opening 54 in the locking plate 52 and when turned the straight portion 55 of the plate lies within the recess 60 and the continued turning of the bolt causes the plate and ears to be compressed together between the collar 68 and the oblique wall 62 of the recess-bearing on the plate 52. There is, therefore, a wedging action due to the shapes of the hole 54 in the plate and the end of the bolt which is most effective for bringing about a close engagement between the two parts of the rim. The degree of obliquity of the wall 62 necessary to accomplish this result is very slight and in consequence there is no danger of the bolt turning back after the rim has gone into use. If further assurance is needed on this point, however, any suitable nut-locking means may be applied to the bolt head 66.

In using my rim on a wheel it is necessary to cut a recess 70 in the felly of the wheel to receive the ears and locking means as shown in Fig. 3 adjacent the hole 72 in the felly for receiving the valve stem 74 of the inner tube 76. This construction, however, is of advantage because it absolutely locks the rim against longitudinal movement on the wheel since the ends of the ears are close to the end walls of the recess.

In assembling the rim with a tire, the tire with the inner tube is first mounted on the section 12 and the valve stem inserted through the hole 48 in the ear 40. The section 10 is then partially inserted in the tire in order to lock the tongues 32 of the interlocking means in the slots 34 and when this has been accomplished the section is then pushed inwardly into engagement with section 12. The locking pin is then inserted and its end pushed through the locking plate. The two parts of the rim are then squeezed together and the bolt turned about a quarter revolution and the assembling operation is completed. To disassemble the rim, the bolt is turned about a quarter revolution to bring the straight portion 56 on its end into register with the straight edge 55 of the opening 54 when the bolt may be withdrawn and the two parts of the rim separated. The only tool required for these operations is a wrench for turning the locking bolt.

It will be observed that the assembling and dis-assembling of the rim are operations extremely simple and performed in a very few movements requiring no exercise of strength. The operations of mounting the rim and tire on a wheel are of course similar to those operations with the rims now generally used in which the felly of the wheel is provided with the usual lip 80 on its inner side against which the rim is forced by clamps 82 engaging the rib 24. The clamps are mounted in the usual manner on bolts set in the outer side of the felly and are held by nuts 84.

The mounting of my rim on various forms of wheels may require slight changes in the rims of the wheels to permit the insertion of the ears and locking mechanism on the rim but these would be apparent to anyone skilled in the art.

It is to be observed that the assembling and dis-assembling of my rim does not affect the shape of the rim because the sections are not strained in any direction. This is of particular advantage over rims which are split transversely and have one end bent inwardly by heavy appliances. It frequently happens in the use of such appliances that one end or the other of the rim is distorted and bent out of shape which affects the efficiency of the rim and also increases the difficulties of mounting it on the wheel.

In the drawings there is shown a space between the edges of the two sections, but this is to clearly illustrate the exact shape of the various parts. When the rim is assembled in practice the inner edges of the two sections and the two ears abut each other in both cases.

It is to be understood that my invention is not to be limited to the exact form hereinbefore shown and described since it may be embodied in various other forms of construction all within the scope of the following claims.

What I claim is:

1. A demountable rim comprising two circumferential sections for holding a vehicle tire, and locking means for said sections including a pair of bored ears, one on each of said sections, a threadless bolt adapted to fit within said bores and having one end restricted in diameter and provided with a transverse groove, a locking plate mounted on one of said ears and having a hole fitting the restricted end of said bolt and said plate being in alinement with said groove when the bolt is inserted within the bores of said ears whereby when said bolt is rotated said ears are locked together in engagement.

2. A demountable rim comprising two circumferential sections for holding a vehicle tire, and locking means for said sections including a pair of bored ears, one on each of said sections, a bolt adapted to fit within said bores and having one end restricted in diameter and provided with a transverse groove, a locking plate mounted on one of said ears and having a hole fitting the restricted end of said bolt and said plate being in alinement with said groove when the bolt is inserted within the bores of said ears whereby when said bolt is rotated said ears are locked together in engagement; the outer wall of said transverse groove in said bolt being slightly oblique to the transverse axis of said bolt to secure a wedging action for drawing said ears together tightly when said bolt is turned.

3. A demountable rim comprising two circumferential sections adapted to hold a vehicle tire, and locking means including a pair of apertured ears, one on each section, a bored locking plate on the outer side of one of said ears, and a threadless bolt adapted to engage said ears with one end portion thereof projecting through said plate, said end portion of the bolt being cut away on one side and grooved transversely, and said plate having its bore adapted to fit said end of the bolt whereby when said bolt is turned a partial revolution the said ears are locked in engagement with each other.

4. A demountable tire rim comprising two circumferential sections, means for holding said sections in assembled relation including a lateral extension on one of said rim sections provided with radially extending tongues adapted to be interlocked in radially extending grooves in the other of said sections by movement of one of the sections radially relatively to the other, and means located on the rim sections diametrically opposite said first mentioned holding means for drawing and locking said sections together, said last mentioned means including a lug on each of said sections, each of said lugs having transversely extending bores, and a threadless bolt adapted to be inserted laterally into engagement with said lugs to extend transversely through the bores thereof, said bolt having on one end portion thereof a wedge surface for drawing and locking said sections together in tight fitting relation upon partial rotation of the bolt, and said bolt when engaged with said lugs acting to hold the rim sections against relative radial movement and to maintain the radial tongues of the first mentioned holding means interlocked with said radial grooves.

In witness whereof, I hereunto set my hand this fourth day of May, 1926.

GUSTAF E. ANDERSON.